United States Patent Office 3,430,082
Patented Feb. 25, 1969

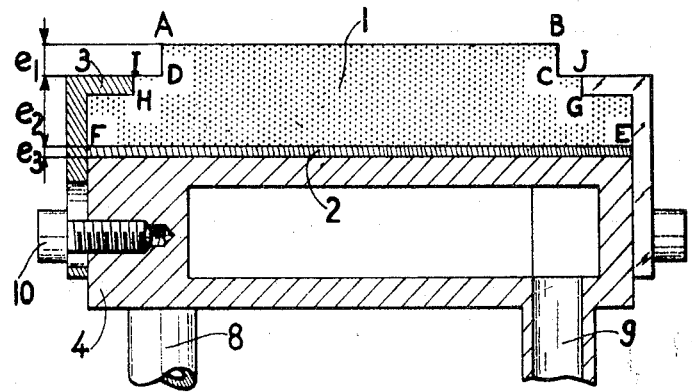
FIG. 1
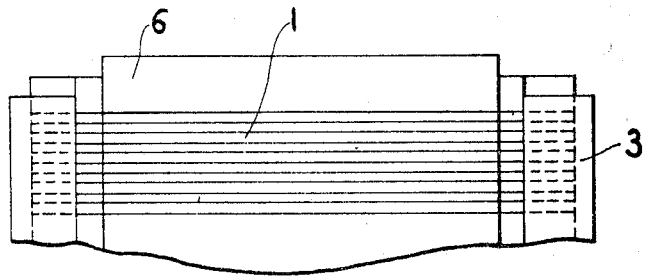
FIG. 3
FIG. 5
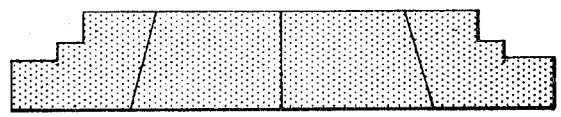
FIG. 6
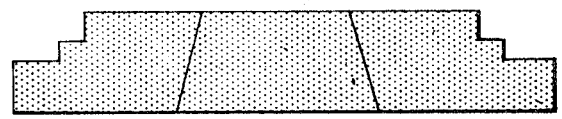

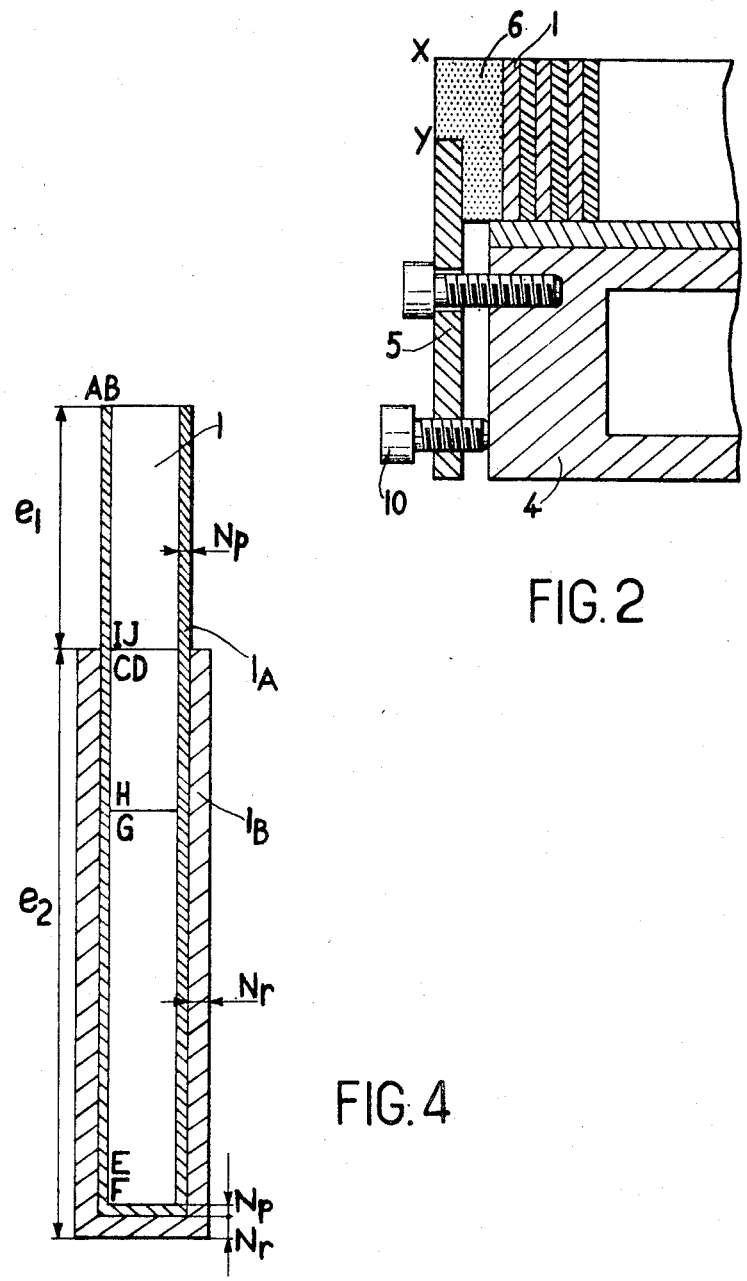

3,430,082
COMPOSITE-STRUCTURE ELECTRODE FOR OPEN-CYCLE MAGNETOHYDRODYNAMIC GENERATOR
David Yerouchalmi, Issy-les-Moulineaux, France, assignor to Commissariat à l'Energie Atomique, Paris, France
Filed May 18, 1966, Ser. No. 551,151
Claims priority, application France, May 25, 1965, 18,235
U.S. Cl. 310—11                         9 Claims
nIt. Cl. G21d 7/02

ABSTRACT OF THE DISCLOSURE

An electrode for an MHD generator is made of an assembly of plates. Each plate is made of a simple or mixed refractory oxides coated with layers of either inert or noble refractory metals over the faces of the electrode plates not subjected to the action of hot gases and the coated surfaces are covered with a thin metal foil. The assembly of plates are mounted on a water cooled metal box with the surface of the box engaged by the plates clad with a stainless refractory alloy. The thickness of the plates are adjustable after optimum operating temperatures have been obtained.

---

The present invention relates to an electrode having a composite structure which is primarily designed to operate in a region in which very high temperatures are developed, for example as a result of the combustion of fossil fuels in an atmosphere of air which may or may not be enriched with oxygen seeded with potassium, as is the case with magnetohydrodynamic (MHD) generators of the open-cycle type.

In an open-cycle MHD generator, the plane frontal electrode-face which is subjected to the atmosphere of the combustion gases must withstand very high temperatures which vary between 2000 and 3000° K. and must also offer resistance to oxidizing atmosphere and to the alkaline vapors of the seeding material while at the same time introducing a negligible voltage drop across the flow of ionized gas as this latter is contacted with the electrodes. Moreover at least the top faces of said electrodes which are thus heated to high temperatures must behave in a satisfactory manner over a long period of time.

Among the materials which are suitable for the purpose of forming the top face of an electrode certain refractory oxides can be employed such as zirconia and thoria which are stabilized by the oxides of calcium, yttrium or the rare earths. Other suitable materials include the zirconates of strontium, of calcium or of barium which is rendered conductive by means of an addition such as monoclinic zirconia. However, only the sufficiently heated part of these oxides is conductive and this is the case with MHD generators in which the electrode usually has the shape of a plate which is heated on one face, namely that face which is in contact with the ionized gas. Below a certain depth which is dependent on the one hand on the thermal conductivity of the refractory oxide plate and, on the other hand, on the thermal flux which results from the conditions of operation of the MHD generator, the refractory oxides are no longer at a sufficiently high temperature to be conductive.

The disadvantages referred to above are effectively overcome by means of the present invention, which accordingly proposes an electrode which affords resistance to high temperatures, to oxidation and to alkaline attacking action on the hot portion of the electrode.

The electrode in accordance with the invention is characterized in that it is made up of an assembly of plates fabricated of simple or mixed refractory oxides coated with layers of either inert or noble refractory metals and associated with a metal box which is cooled by an internal circulation of water.

Materials which are particularly well suited to the fabrication of electrode plates are stabilized zirconium oxide which may be blended if necessary with a doping agent for enhanced thermionic emissivity, and the zirconates of lime, of strontium, of barium or of calcium to which are added monoclinic zirconia having a density which varies between 85 and 90% of theoretical.

In accordance with one of the important features of the invention, those faces of the electrode plates which are not subjected to the action of hot gases are coated first with a dispersion of noble or inert refractory metal which is anchored to the surface by heat treatment at a temperature above 850° C., then with an electrolytic deposit of a noble or inert refractory metal or alloy, and finally with a thin metal foil of the same composition. The metal foil surrounds the electrode plate to a depth which essentially depends on the thermal flux of the MHD converter and on the nature of the material which constitutes the plates.

The electrode plates which are thus coated are joined together by brazing in a direction at right angles to the flow of combustion gases. The bonding of the plates is performed by means of a heat treatment at a temperature above 1500° C.

The metallic coating of the electrode plates is intended in the first place to effect the transfer of electrical conductivity between the hot portion of the zirconium oxide which is exposed to the combustion gases and the electrode support which serves as a structural member while also providing lead-in ducts for the current supply cables and performing the function of a cooling element. The metals which are particularly suitable for the formation of the coating are platinum, rhodium, iridium or alloys of these metals.

The combined assembly of electrode plates is associated with a metal box having good electrical and thermal conductivity and cooled internally by a flow of water. That face of said box against which the assembly of plates is brought to bear is clad with a stainless metal alloy which is bonded with said box. Said alloy has high-temperature strength properties at 1000° C., possesses good electrical conductivity but has a thermal conductivity which is inferior to that of the metal which constitutes the metal box. The intended function of said alloy is to permit a transition in the temperature scale between the assembly of coated plates and the cooling box proper. This alloy can belong to the family of stainless steels, nickel steels or other stainless refractory alloys.

The three layers of noble or inert refractory metal with which the electrode plates are coated can each have a thickness which, by way of non-limitative example, can vary between $6/1000$ and $12/1000$ mm. in the case of the first layer and between 2 and $5/100$ mm. in the case of each of the last two layers. The plate assembly which is thus formed accordingly constitutes a refractory electrode element in a single frontal unit. The current produced, for example, in a magnetohydrodynamic generator is transmitted by said plate assembly to the electrically and thermally conductive metallic support which is cooled by a circulation of water. The support referred to also constitutes a structural element and is additionally employed for providing electrical connections between one or a number of external circuits and the electrode plate assembly.

One particularly important feature of the invention consists in providing for each case of operation of a magnetohydrodynamic generator to which a particular thermal flux corresponds, firstly a wall temperature which is compatible with the strength of the constituent materials of the frontal portion of the electrode, secondly a temperature at which electric current will be transmitted to the metallic coating of the electrode plates within the limits of optimum electrical conductivity, and finally a temperature of contact between coated plates and stainless metal alloy which is such that a ceramic electrode-plate is not subjected to excessive temperature differences and is therefore protected against destructible thermal stresses. Provision has accordingly been made for a support on which the thickness of the plates can be adjusted after the optimum operating temperatures of different parts of the electrode in respect of given thermal conditions have been obtained both by calculation and experiment.

In the channel or venturi tube of a magnetohydrodynamic converter, the temperature of the combustion gases decreases along the entire path followed by these latter by approximately 300 to 400° C., with a resulting substantial reduction in the conversion rate at the downstream end of the channel. This temperature drop is essentially due to the energy which is extracted during the passage of the gases through the channel, but is also due to heat transfer losses through the channel walls. It is disclosed in this invention that, if electrode plates fabricated of a zirconium oxide or of a refractory zirconate having variable thickness are disposed on a metal support which is adapted thereto, it is possible to calculate and determine by experiment the thicknesses which are necessary for the purpose of ensuring along a channel or venturi tube both a constant temperature of the frontal electrode walls and a constant temperature of the zones in which the electric current is transmitted, namely from the electrode plate to the metallic coating and from the metallic coating to the stainless metallic alloy. A conversion channel which is thus thermally homogenized permits of uniform extraction of energy over the entire channel length.

A clearer understanding of the invention will be gained by perusal of the following description, reference being made to the accompanying drawings which show two exemplified embodiments of an electrode in accordance with the invention, and in which:

FIG. 1 represents a transverse cross-section of a complete electrode and shows the system of lateral clamping of the electrode plates;

FIG. 2 represents a transverse cross-section of a composite electrode showing the system of longitudinal clamping of the plates;

FIG. 3 is an overhead view of the electrode;

FIG. 4 shows the metallic coating of the electrode plates;

FIGS. 5 and 6 are two views in profile of an electrode plate assembly;

Figure 7:
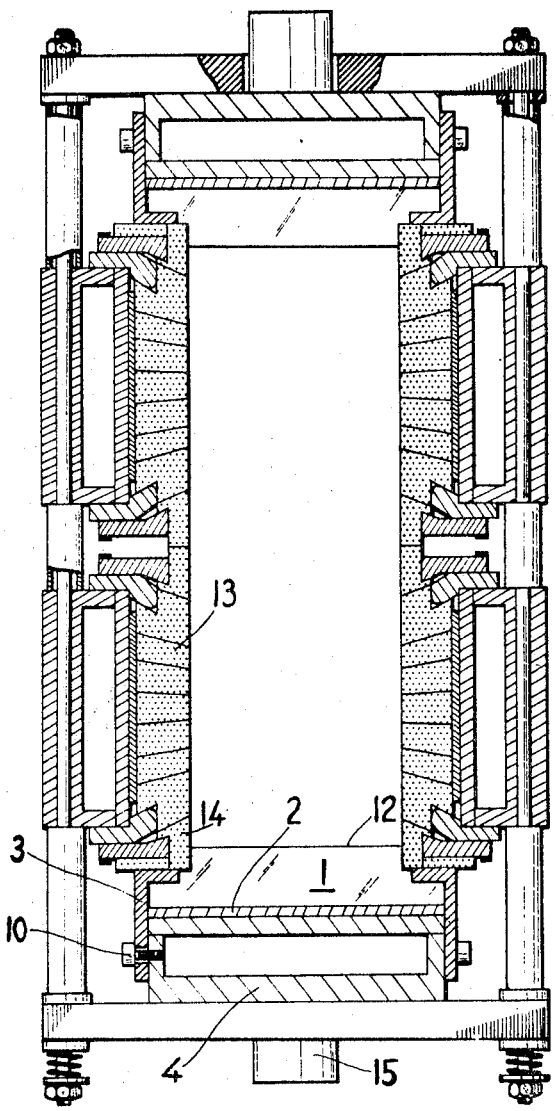
FIGS. 7 and 8 represent respectively a transverse cross-section and a longitudinal cross-section of one mode of assembly of an electrode in accordance with the invention within the channel of a magnetohydrodynamic converter.

FIG. 1 shows the electrode plate 1 ABCGEFHD which can be constructed in one unit in the case of electrodes having the dimensions required in MHD conversion channels of medium power; or alternatively, said electrode plate can be formed of elements which are arranged in a plane arch and interconnected by means of alternate plates of the type shown in FIGS. 5 and 6 for use in high-power channels of large size. These elements are clamped in the same manner as the single-unit plates by virtue of the triple coating of noble or inert refractory metals or alloys with which they are provided.

The combined assembly of coated plates is associated with a metal box 4 which is fabricated of a conductive metal of the class of copper or copper alloys, said box being provided with an inlet 8 and an outlet 9 which serve both for the circulation of cooling water and as lead-out ducts for the current supply cables. The metal box is separated from the plate assembly by a layer 2 of refractory metal alloy which is bonded with said box.

An even and symmetrical number of angle-bar elements 3 formed of refractory metal alloy serve to effect the lateral clamping of the plate assembly on the metal box. By means of adjusting screws 10, the heads of which are fitted within an elongated slot of each angle-bar element 3, it is possible by means of said elements to set the plate assembly at a height $e_2$ which can be varied according to the values of thermal flux of a given mode of operation in a magnetohydrodynamic generator.

FIG. 2 shows the longitudinal clamping of the coated electrode plates by means of a plate 5 which is applied by means of two screws 10 against a refractory oxide element having the same composition as the electrode plates. Symmetrical clamping is also provided at the other end of the electrode. By varying the height $xy$ of the clamping plates such as the plate 5, the variation of heights $e_2$ of the elements 1 can readily be followed.

FIG. 3 is a fragmentary view of an electrode in accordance with the invention, looking from above.

The metallic coating of the electrode plate 1 is shown in FIG. 4. The electrode plate 1 is first surrounded by two different layers of noble or inert refractory metal or alloy, one layer consisting of a dispersion which is bonded to to surface itself as a result of heat treatment above 850° C., the second layer being applied on the first by electrolysis. These two layers 1A are represented by the total thickness $Np$ and pass through the bottom portion of the electrode plate for transmitting the current which is generated on the frontal face AB. The layer 1B having a thickness designated as $Nr$ represents the foil of noble or inert refractory metal or alloy which is intended to increase the thickness of the initial coating 1A with a view to ataining the levels of electrical and thermal conductivity which have been determined by calculation and measurement. Said foil $Nr$ surrounds the electrode plate to a depth $e_1$ at which said foil is intended to act in conjunction with the double layer 1A so as to effect the transmission of current towards the cold part of the electrode.

The coated electrode plates such as those which have been described in reference to FIG. 4 are assembled along their largest faces and subjected to a heat treatment above 1500° C., with the result that the plates are bonded together.

The operation of an electrode in accordance with the invention can be summarized as follows, reference being had to FIG. 1. As soon as the value of the thermal flux of the MHD convertor is known, the choice of materials constituting the electrode plates 1 and plate coatings as well as the choice of the refractory metal alloy 2 make it possible according to their physical characteristics to establish the thickness $e_1$, $e_2$ and $e_3$ in such a manner as to ensure that the hot frontal face AB is at a temperature which is compatible with a long service life, that the zone IDCJ is at a temperature which, on the one hand, is conducive to an electrical conductivity of the simple and/or mixed refractory oxide which is higher than that of the seeded gases flowing through the MHD conversion channel and which, on the other hand, ensures that the two first layers of the coating material 1A which initially cover all the electrode plates remain at least to the level IDCJ and, finally, that the interface between the plate 1 and the layer 2 is at a temperature which does not subject the ceramic material of the plate 1 to excessive thermal stresses.

The design of the metal box 4 which is associated with its metallic components 3, 5 and 10 and with the ceramic plate 6 which provides a structural support for the electrode plates is such that, when utilizing complete sets of elements 1 coated with different thicknesses $e_1$ or $e_2$, it is possible not only to meet conditions of operation in which different values of thermal flux may be encountered, but also to maintain a constant electrode temperature throughout the MHD channel.

Figure 8:
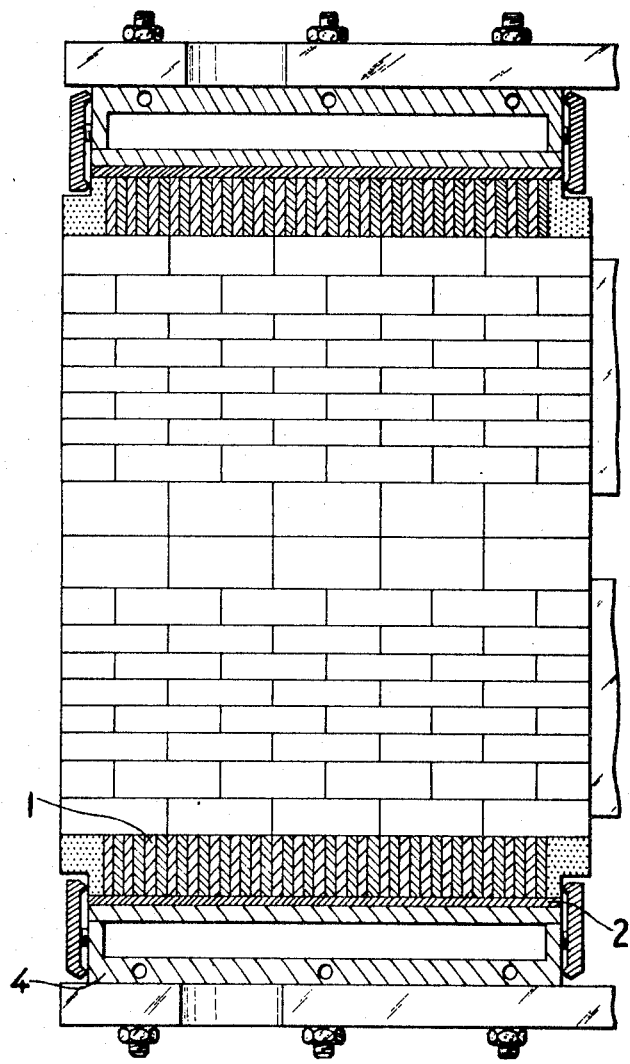

In FIGS. 7 and 8 which shown respectively a transverse cross-section and a longitudinal cross-section of one mode of assembly of an electrode in accordance with the invention in the channel of an MHD converter, that face of the electrode which is subjected to the hot gases is designated by the reference numeral 12 and the insulating walls are designated by the reference numerals 13. The L-section members which are designated by the reference numeral 3 and which serve to clamp the electrode plates are brought to bear on the angle elements 14 of the insulating walls. The water which is employed for the purpose of cooling the metal box 4 is admitted and discharged through the opening 15 which also serves as a lead-out duct for the current-supply cables.

As will be readily understood, the present invention is not limited in any sense to the embodiments herein described but extends to any and all alternative forms which come within the definition of equivalent means.

What I claim is:

1. Composite electrode as primarily designed for use in the channel of a magnetohydrodynamic converter, wherein said electrode is constituted by an assembly of plates, each of said plates formed of refractory oxide and coated where not subject to hot gases with layers of metals selected from the group consisting of both noble and inert refractory metals, each of said plates engaging adjacent plates on coated surfaces and said assembly being mounted in heat conductive relationship on a metal box cooled by a circulation of water.

2. Electrode as claimed in claim 1, wherein the materials which constitute said electrode plates are selected from the group consisting of stabilized zirconium oxide blended with a doping agent for enhanced thermionic emissivity, of the zirconates of lime, of strontium, of barium and of calcium to which are added monoclinic zirconia.

3. Electrode as claimed in claim 1, wherein the faces of the electrode plate which are not subjected to the action of hot gases are coated first with a dispersion of a metal selected from the group consisting of noble and inert refractory metals, then with an electrolytic deposit of a metal which is selected from the group of noble and inert refractory metals and alloys, and finally down to a predetermined depth of the hot face with a thin foil of a metal selected from the group consisting of noble and inert metals.

4. Electrode as claimed in claim 1, wherein the electrode plates which are surrounded by the dispersion of refractory metal and by the electrolytic deposit of a metal and by these same coatings and by a thin metal foil are varied in thickness by the metal box clamping system whereby requisite temperatures may be obtained at given depths of the electrode and maintained constant along a magnetohydrodynamic conversion channel.

5. Electrode as claimed in claim 1, wherein the metals employed for the purpose of coating the electrode plates are selected from the group consisting of platinum, rhodium, iridium and alloys of these metals.

6. Electrode as claimed in claim 1, wherein the electrode plate assembly is separated from the metal box by a stainless refractory alloy which possesses good electrical conductivity but has a thermal conductivity which is inferior to that of the metal which constitutes the cooled box.

7. Electrode as claimed in claim 1, wherein angle-bar elements of refractory metal alloy serve to effect the lateral clamping of the coated electrode-plate assembly against the metal box.

8. Method of preparation of an electrode comprising the successive steps of coating those faces of the electrode plates which are not subjected to the action of hot gases with a dispersion of a metal selected from the group consisting of noble and inert refractory metals, of heating said plates which are thus coated to a temperature above 850° C., of electrolytic coating of said faces with a metal selected from the group of noble and inert refractory metals and alloys, of cladding with a thin foil of a metal which is chosen from the group consisting of noble and inert refractory metals and alloys, of assembling said electrode plates along the larges faces thereof, of heating to a temperature above 1500° C. in order to form a bond between said electrode plates, of fixing said plates on a metal box which is cooled by a flow of water and which is coated by brazing with a stainless metal alloy on that face against which the electrode plate assembly is intended to be applied.

9. Magnetohydrodynamic generator as designed for the use of electrodes claimed in claim 1, wherein said electrodes are so disposed that the face of the electrode plates which are not coated with refractory metals is in contact with the hot ionized gases.

References Cited

UNITED STATES PATENTS

| 3,165,652 | 1/1965 | Prater | 310—11 |
| 3,149,253 | 9/1964 | Luebke | 310—11 |
| 3,319,091 | 5/1967 | Burhorn et al. | 310—11 |

DAVID X. SLINEY, *Primary Examiner.*

U.S. Cl. X.L.

313—310, 346